B. WILLIAMS.
Improvement in Fences.
No. 127,536.  Patented June 4, 1872.
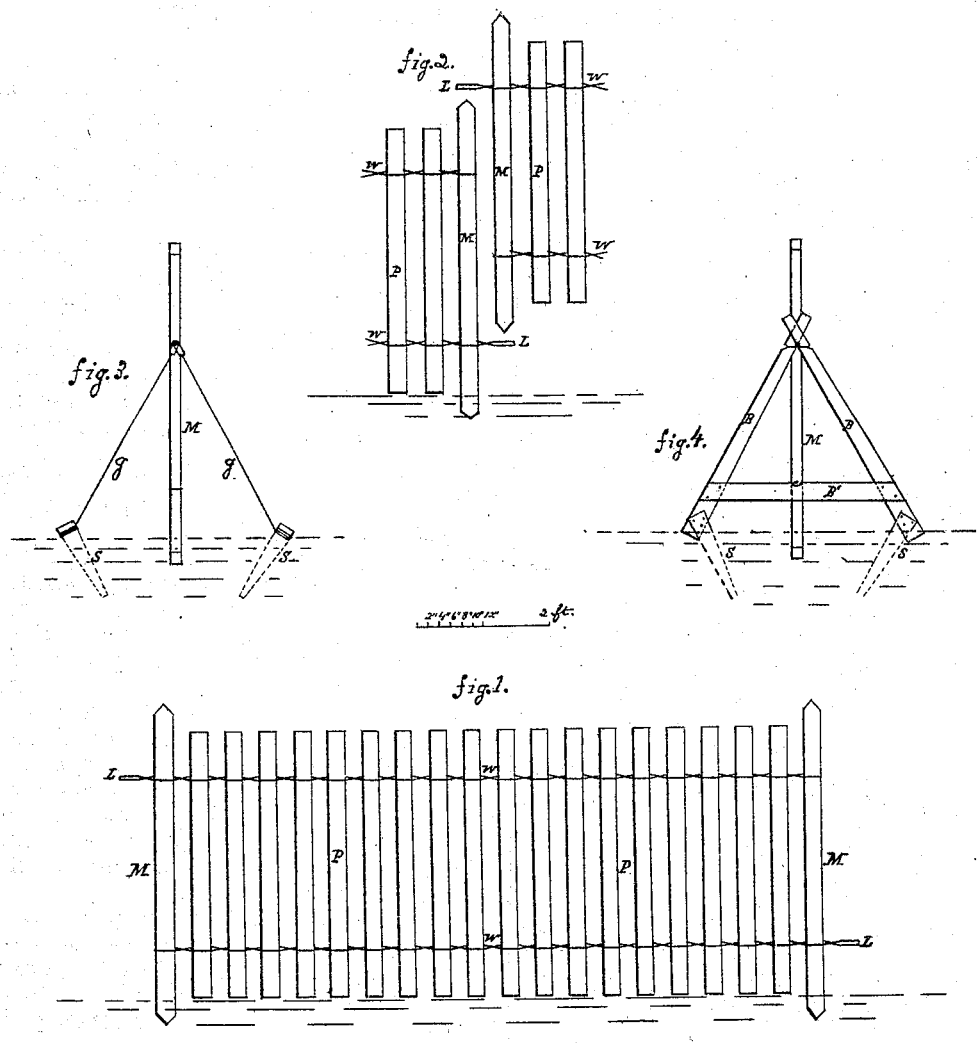
Witnesses:
Oscar Snell.
John Williams.
Inventor:
Byron Williams.

UNITED STATES PATENT OFFICE.

BYRON WILLIAMS, OF WILLIAMSBURG, OHIO.

IMPROVEMENT IN FENCES.

Specification forming part of Letters Patent No. 127,536, dated June 4, 1872.

I, BYRON WILLIAMS, of Williamsburg, in the county of Clermont and State of Ohio, have invented certain Improvements in Fences, of which the following is a specification:

My invention relates to making a light and strong fence at the minimum outlay of labor and expense, that can easily be removed without injury to its construction, and whose efficiency, when in position, is only limited by the decay of its materials. This invention consists of a combination of two styles of pickets carried by horizontal wires terminating in loops for the ready union of its sections or panels, the whole supported by a peculiarly-adapted system of bracing, better described from the drawing.

Figure 1 represents a single or disconnected panel or section of the fence; P P are small pickets, forming the body of the panel; M M are master-pickets, notched to keep the wires in their place, stronger than P, to resist the longitudinal strain of the wires, and a few inches longer at both ends, so that they can be used either end down, and thus hold the small pickets from the ground. The wires w w are uniformly cut rather more than twice the desired length of the section. The ends of each wire being joined together, two complete belts are formed.

This fence has the advantage of being constructed under shelter, and stored until needed, or of being built with equal facility in the position of its usefulness. In the first case the wire-belts w w are stretched upon a rectangular frame, in the sides of which, near the ends, frequent holes are bored, in which pins are placed to accommodate the varying lengths of the sections. The master-pickets are then placed in the ends of the belts with the wires in the notches. The loops L L, one to each belt, but at opposite ends, are made by placing blocks of the required size of the loop in the double of the belt, and giving several quick twists. The common pickets are then inserted, as shown in the drawing, and a sharp blow is given the wires where they cross the pickets, preventing them from falling out in handling. The section is then ready to carry to the field, where it can be attached to and be detached from posts by methods for detaining wires, which have long been in use, and which I do not present as new. As the labor of setting and resetting posts to meet the demands of a portable fence is very considerable, a plan for bracing this panel is shown in Figs. 3 and 4.

In Fig. 3 $g$ is a wire, one end of which fastens to the staggering-stake $s$, while the other is formed into a small flat loop, just large enough to pass over the loops L, which makes an exceedingly light and strong support when the fence is on right lines. In all angles the device shown in Fig. 4 is especially useful, in which B B are braces, closely bound together at the top by a wire that also fastens the upper wire $w$, while the lower wire $w$ is firmly held in the notch of the cross-piece B', that connects them at the bottom.

Fig. 2 shows the manner of uniting the panels to form a continuous fence, in which the loop L of the bottom wire should be in the direction of the progress of the fence. The flat loops of the wires $g$ $g$ are then slipped over the loop L of the top wire of the next section, which is then lifted up till the foot of the picket M is caught in the lower loop of the last section, at the same time the top loop is caught on the last picket M, when the whole section is eased down, uniting the two most securely. The stakes $s$ $s$ are then driven obliquely toward the perpendicular of the fence until the wires are taut.

When it is desired to make the fence and put it in position at the same time, the master-pickets, with the braces and stakes, are put in their places with the loop-ended belts connecting them, after which the common pickets are filled in.

Claim.

I claim as my invention—

The portable panel formed by the pickets, with the wire-belts $w$ $w$ terminating in the loops L L for uniting the panels into a continuous fence, as hereinbefore set forth.

BYRON WILLIAMS.

Witnesses:
JOHN WILLIAMS,
OSCAR SNELL.